United States Patent
Mundy

[15] 3,703,917
[45] Nov. 28, 1972

[54] VEGETABLE PROCESSING APPARATUS

[72] Inventor: Frank Percival Mundy, Donvale, Victoria, Australia

[73] Assignee: Pict Limited, Notting Hill, Victoria, Australia

[22] Filed: Dec. 28, 1970

[21] Appl. No.: 101,546

[30] Foreign Application Priority Data

Jan. 26, 1970   Australia.......................95/70

[52] U.S. Cl..........................................83/2, 99/485
[51] Int. Cl.............................A47j 23/00, A23b 7/02
[58] Field of Search...............................146/56, 78 R

[56] References Cited

UNITED STATES PATENTS

| 3,028,893 | 4/1962 | Cannell | 146/56 |
| 3,361,173 | 1/1968 | Lamb | 146/78 R X |

*Primary Examiner*—Willie G. Abercrombie
*Attorney*—Wenderoth, Lind & Ponack

[57] ABSTRACT

The invention provides apparatus for the pricking of vegetable pulse skins with improved means for guiding the pulses to and removing them from a rotating pin-drum.

4 Claims, 4 Drawing Figures

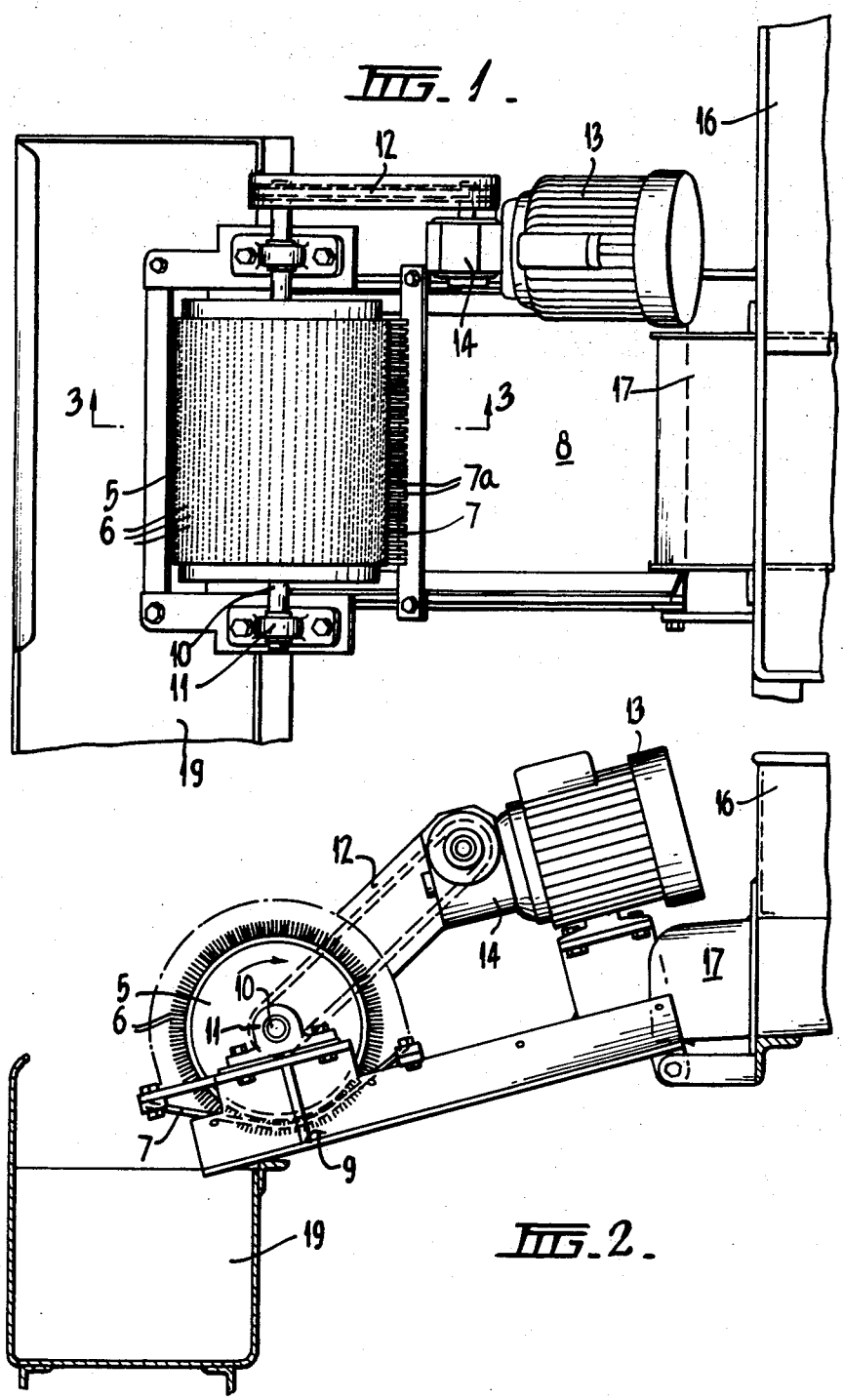

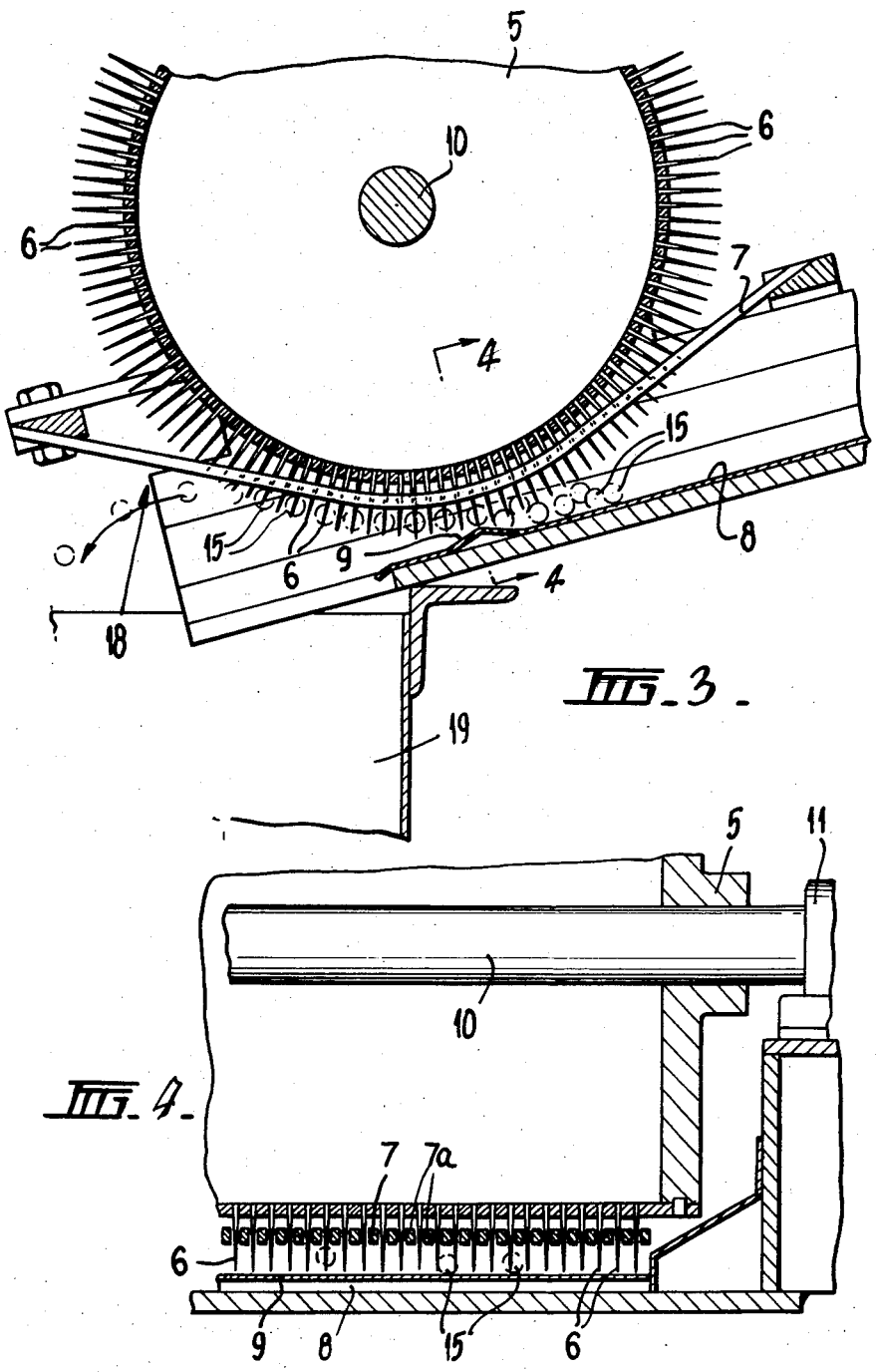

VEGETABLE PROCESSING APPARATUS

This invention is concerned with the processing of vegetable pulses such as peas and beans and, in particular, seeks to provide an improved pulse piercing or pricking machine.

It is known that the puncturing of the skin of vegetable pulses which are to be preserved by freezing greatly enhance the appearance of the cooked pulses by reducing wrinkling (see Australian patent No. 286,440 to CSIRO); and it is known that the puncturing of pulses will significantly reduce the time required for their dehydration (see Australian patent No. 204,434 Unilever). However, the prior art devices for pricking pulses known to the applicant are either inefficient in that they over or under pierce the pulse, or they tend to be expensive and cumbersome. Accordingly, the present invention seeks to provide a simple yet efficient machine for the purpose.

Basically, the apparatus of the invention comprises a pin-drum mounted for rotation about its axis, a stripper-plate mounted below the drum having a plurality of slots through which the drum pins may pass when the drum rotates, and a feed sluice, trough or conveyor arranged beneath the stripper-plate and pin-drum to feed the pulses for piercing by pins projecting through the stripper-plate.

Preferably, the slotted stripper-plate is of an arcuate shape so that it follows the curve of the pin-drum surface, at least at the lowermost portion of the drum which lies directly opposite the feed sluice or the like. It is also preferable that the leading portion (with respect to pulse flow) of the stripper-plate forms, with the bottom of the feed sluice, a converging guide for the pulses to ensure that they come beneath the pins as a single layer. Similarly, it is another preferred, but not essential, feature of the invention for the trailing portion of the stripper-plate to follow the curve of the pin-drum and then diverge from the drum substantially above the level of the bottom thereof so that pulses impaled on the pins will be disengaged by the stripper-plate at a point substantially displaced from the point of pick up. This allows whole, pierced pulses to be readily separated from undersized pulses and pulse fragments which are not pierced or fall off the pins before striking the stripper-plate, the separation being achieved by collecting the pierced and disengaged pulses in a separate sluice or the like.

According to another preferred feature of the invention, a transverse ridge is raised in the base of the feed sluice at the point of closest approach of the pin-drum so that the pulses are moved upward toward the pins as they flow along the sluice. This allows the pin-drum to be run at higher speeds than otherwise, the maximum speed of the drum being determined by the degree of slashing which can be tolerated as the pins enter the pulses. In this respect, it is also preferable to ensure that the pulses are fed to the drum along the sluice, conveyor or trough at the same linear speed as the tips of the pins on the drum.

In order to further portray the nature of the invention, a pea prickling machine made in accordance therewith will now be described by way of example with reference to the accompanying drawings, in which;

FIG. 1 is a plan view of the machine;
FIG. 2 is a side elevation thereof;
FIG. 3 is a part cross-sectional view taken on the line 3—3 of FIG. 1; and
FIG. 4 is a part cross-sectional view taken on the line 4—4 of FIG. 3.

Referring now to the drawings a roller 5 is provided having circumferential rows of pins 6 on its surface, and is mounted for rotation above an arcuate stripper-plate 7. The plate 7 is provided with slotted apertures 7a disposed in alignment with the rows of pins 6 on the rollers 5.

Spaced below the plate 7 is a platen surface 8 having a transverse raised area 9.

The roller 5 is carried by a shaft 10 journalled in bearings 11 and rotated by a chain drive 12 from an electric motor 13 via a reduction gearbox 14. If desired the reduction ratio of the gearbox 14 may be variable to provide different operating speeds of the roller or alternatively the speed of the motor 13 may be controlled electrically by known means.

In operation the roller 5 is in the direction indicated by the arrow and peas 15 (see FIG. 3) are fed in a single layer to the platen 8 from a conveyor 16 via chute 17. The disposition of the platen 8 is such that it slopes downwards from the chute 17 to facilitate movement of the layer of peas under the action of gravity towards the transverse raised area 9. In the vicinity of the raised area 9 peas are impaled on the pins 6 and carried thereon as indicated in FIG. 3 until they strike the plate 7 at position 18 to be discharged therefrom to a collection bin or conveyor 19.

The spacing of the pins 6 on the roller surface is such that all peas fed to the platen 8 are pierced in the desired manner and to suit various production rates the speed of rotation of the roller 5 and disposition of the platen 8 relative thereto may be varied.

An advantage arising from the operation of the apparatus is that the pierced peas are discharged from the pins at a point above the platen 8, whereas trash matter such as skins, splits, leaves and pod fragments may pass under the pins, and are thus not lifted to the plate 7, but will continue to follow the platen 5 may be directed to a separate receptacle (not shown).

The peas are fed to the platen 8 from the chute 17 in a stream of water to facilitate ready movement of the peas across the platen surface.

The plate 7 may comprise a slotted sheet of metal or a series of spaced bars fixed at either end in suitably clamped spacing means to provide the apertures 7a.

I claim:

1. Apparatus for processing vegetable pulses comprising a pin-drum mounted for powered rotation about its axis, a stripper plate mounted below the drum having a plurality of slots penetrated by the drum pins during rotation of the drum, a feed sluice arranged beneath said stripper plate and pin drum to guide pulses beneath the stripper plate for piercing by pins projecting through the stripper plate, said stripper plate being of an arcuate shape and disposed with relation to the feed sluice to form a converging guide to direct a layer of pulses beneath the pin drum, said feed sluice includes a platen surface comprising a raised transverse portion disposed beneath the pin drum and parallel with the axis thereof at the point where penetration of the stripper plate by the pins is at a maximum.

2. Apparatus for processing vegetable pulses comprising a pin-drum mounted for powered rotation above an arcuate platen surface, a stripper plate disposed between the drum surface and the platen surface and provided with parallel slots for penetration by the drum pins during rotation of the drum, means for feeding pulses in a water stream to the platen surface for piercing by the drum pins, the disposition of the stripper plate with regard to the pin-drum being such that as rotation of the drum continues the pins traverse the slots from a point of minimum penetration therethrough and pass through a point of maximum penetration to a further point of minimum penetration, said platen surface having a transverse ridge disposed beneath the stripper plate at the point of maximum pin penetration such that pulses are progressively pierced by the pins up to a point of maximum penetration as they pass over the transverse ridge and are then stripped from the pins by the stripper plate as rotation of the pin-drum continues.

3. Apparatus according to claim 2 wherein the disposition of the platen surface with respect to the pin-drum is such that pulses are fed to the transverse raised portion at substantially the same linear speed as the drum pins.

4. Apparatus according to claim 2 wherein the speed of the pin-drum is variable and the disposition of the feed sluice with regard to the stripper plate and pin-drum may be adjusted to control the rate of delivery of pulses to the pin-drum.

* * * * *